(12) United States Patent
Huang et al.

(10) Patent No.: US 11,155,113 B2
(45) Date of Patent: Oct. 26, 2021

(54) HOLOGRAPHIC SECURITY ELEMENT AND METHOD OF FORMING THEREOF

(71) Applicant: Agency for Science, Technology and Research, Singapore (SG)

(72) Inventors: Kun Huang, Singapore (SG); Jinghua Teng, Singapore (SG); Xiao Ming Goh, Singapore (SG); Junhao Shawn Tan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 16/754,317

(22) PCT Filed: Nov. 2, 2018

(86) PCT No.: PCT/SG2018/050556
§ 371 (c)(1),
(2) Date: Apr. 7, 2020

(87) PCT Pub. No.: WO2019/088929
PCT Pub. Date: May 9, 2019

(65) Prior Publication Data
US 2020/0331283 A1    Oct. 22, 2020

(30) Foreign Application Priority Data

Nov. 3, 2017  (SG) ........................... 10201709097Q (51) Int. Cl.
*B42D 25/328*     (2014.01)
*G03H 1/02*       (2006.01)
(Continued)

(52) U.S. Cl.
CPC .......... *B42D 25/328* (2014.10); *G03H 1/024* (2013.01); *G06K 19/16* (2013.01)

(58) Field of Classification Search
CPC ....... B42D 25/328; G06K 19/16; G03H 1/024
(Continued)

(56) References Cited

U.S. PATENT DOCUMENTS

2001/0050787 A1   12/2001   Crossland et al.
2008/0212040 A1    9/2008   Aksyuk
(Continued)

FOREIGN PATENT DOCUMENTS

CN        103260893 A     8/2013
CN        105303222 A     2/2016

OTHER PUBLICATIONS

International Search Report for International Application No. PCT/SG2018/050556 dated Jan. 29, 2019, pp. 1-5.
(Continued)

*Primary Examiner* — Justin V Lewis
(74) *Attorney, Agent, or Firm* — Winstead PC (57) ABSTRACT

There is provided a holographic security element including a substrate; and an array of nano-reflectors configured to form a pattern on the substrate and to generate a holographic image corresponding to the pattern at a predetermined distance from the substrate when irradiated with a predetermined light source. In particular, the array of nano-reflectors is configured to generate the holographic image at the predetermined distance to have a size that is larger than a size of the pattern. There is also provided a method of forming the holographic security element, and an article having one or more holographic security elements incorporated therein.

16 Claims, 6 Drawing Sheets

(51) Int. Cl.
  *G06K 19/16*  (2006.01)
  *B42D 25/373* (2014.01)
  *B42D 25/41*  (2014.01)
  *B42D 25/30*  (2014.01)
  *G06N 3/12*   (2006.01)
  *G03H 1/22*   (2006.01)
  *G03H 1/00*   (2006.01)

(58) Field of Classification Search
  USPC ....... 283/61, 62, 67, 70, 72, 91, 94, 98, 901
  See application file for complete search history.

(56) References Cited

U.S. PATENT DOCUMENTS

| | | | |
|---|---|---|---|
| 2009/0086296 A1 | 4/2009 | Renaud-Goud | |
| 2011/0164783 A1 | 7/2011 | Hays et al. | |
| 2016/0187546 A1* | 6/2016 | Raksha | G09F 3/0376 283/85 |

OTHER PUBLICATIONS

Written Opinion of the International Searching Authority for International Application No. PCT/SG2018/050556 dated Jan. 29, 2019, pp. 1-6.

International Preliminary Report on Patentability for International Application No. PCT/SG2018/050556 dated Dec. 17, 2019, pp. 1-22.

Huang et al., "Photon-Nanosieve for Ultrabroadband and Large-Angle-of-View Holograms," Laser Photonics Reviews, vol. 11, No. 3, 2017, pp. 1-9.

Fritz et al., "Creating a Reflection Hologram of a Magnified Object (Nov. 2011)," https://stanford.edu/~avfritzl/hologram/HolographyFinal.pdf, 2011, pp. 1-3.

Scheuer et al., "Wide-Angle, Broadband, and Highly Efficient Holography," Proc. of SPIE, Jan. 28, 2016, pp. 1-3.

Finke et al., "Wide Viewing Angle Holographic Display with a Multi Spatial Light Modulator Array," Proc. of SPIE, vol. 7723, 2010, pp. 1-8.

Huang et al., "Aluminum Plasmonic Multicolor Meta-Hologram," Nano Letters, 2015, vol. 15, pp. 3122-3127.

Zheng et al., "Metasurface Holograms Reaching 80% Efficiency," Nature Nanotechnology, 2015, pp. 1-5.

Yifat et al., "Highly Efficient and Broadband Wide-Angle Holography Using Patch-Dipole Nanoantenna Reflectarrays," Nano Letters, 2014, vol. 14, pp. 2485-2490.

Chen et al., "High-Efficiency Broadband Meta-Hologram with Polarization-Controlled Dual Images," Nano Letters, 2014, vol. 14, pp. 225-230.

* cited by examiner

HOLOGRAPHIC SECURITY ELEMENT AND METHOD OF FORMING THEREOF

CROSS-REFERENCE TO RELATED APPLICATION

This application claims the benefit of priority of Singapore Patent Application No. 10201709097Q, filed 3 Nov. 2017, the content of which being hereby incorporated by reference in its entirety for all purposes.

TECHNICAL FIELD

The present invention generally relates to a security element and a method of forming the security element, and more particularly, to a holographic security element that may be incorporated in an article of interest for anti-counterfeiting.

BACKGROUND

Anti-counterfeiting technologies are of particular importance as counterfeiting and forgery pose significant financial damage to global enterprises. As a safeguard, security tags (security elements) are routinely incorporated into various articles, such as banknotes, credit cards and product packaging. Security tags may be designed as graphical markers and/or spectrally encoded labels with characteristic physical properties under an external stimuli, and verified by the naked eye or authenticated using analytical tools, such as optical microscopes or Raman spectroscopy. Unique security tags with features that have a high barrier to direct replication, yet are easy to detect, are attractive for deterring easy duplication. For example, security tags may include hard-to-replicate features, such as fine prints, intaglio prints, security-ink-printed images, watermarks, and holograms. However, the barrier-to-entry to replicating anti-counterfeiting techniques is continually being compromised as a consequence of technological advancements, which enables or makes replication easier.

In recent years, the adoption of nanoscale features have enabled microscopic images to be formed, such as in the form of ultra-high resolution reflective plasmonic pixels, structural colour prints, as well as metasurface holograms. These nanoscale features enable the formation of micro-images in a single small foot-print area and could be envisioned for encoding covert images in anti-counterfeiting tags. Furthermore, multiple-level security tagging could be achieved through involving the encryption of an additional level of security by means of a hidden security feature engineered within the tag, where the first level may be a simple marker easily validated by the general public and the second level may be a unique feature that requires authentication by advanced analytical instruments.

However, various challenges hamper widespread use of nanoscale elements in the field of security tagging, including:

- unique features in the security tags may be required to deter easy replication (for example, various conventional tagging approaches may have predicable and deterministic decoding mechanisms);
- inspection tools employed for verification may not be destructive to security tags (for example, various conventional approaches may employ destructive inspection tools for verification);
- a sufficiently large (e.g., centimeter-scale) area may be required to be covered by the nanoscale features for the security tag to be visible without using specialised optical instruments (e.g., by the naked eye) between the holographic imaging plane (e.g., image screen) and the hologram plane (plane of the security element) to ensure easy verification of the security tag for the general public; and
- an area large enough to be observed by the naked eye, yet bearing nanoscale features, may be inherently be time-consuming (and hence costly) to fabricate.

A need therefore exists to provide a security element, as well as a method of forming thereof, that seek to overcome, or at least ameliorate, one or more of the deficiencies or problems associated with conventional security elements, and more particularly, to a holographic security element that may be incorporated in an article of interest for anti-counterfeiting.

SUMMARY

According to a first aspect of the present invention, there is provided a holographic security element comprising:
a substrate; and
an array of nano-reflectors configured to form a pattern on the substrate and to generate a holographic image corresponding to the pattern at a predetermined distance from the substrate when irradiated with a predetermined light source, wherein the array of nano-reflectors is configured to generate the holographic image at the predetermined distance to have a size that is larger than a size of the pattern.

In various embodiments, the size of the pattern is at most of micron scale and the size of the holographic image is at least of centimeter scale.

In various embodiments, the size of the pattern has a largest lateral dimension that is smaller than about 1,000 micrometers, and the size of the holographic image has a smallest lateral dimension that is larger than about 1 centimeter.

In various embodiments, the size of the holographic image is at least 50 times larger than the size of the pattern.

In various embodiments, the array of nano-reflectors is configured to directly generate the holographic image at the predetermined distance.

In various embodiments, spatial locations of the array of nano-reflectors on the substrate are configured to form the pattern such that interference of the reflected light from the array of nano-reflectors when irradiated with the predetermined light source generates the holographic image having substantially the above-mentioned size at the predetermined distance.

In various embodiments, the predetermined light source is a laser light source.

In various embodiments, each of the array of nano-reflectors is a nano-mirror.

According to a second aspect of the present invention, there is provided a method of forming a holographic security element, the method comprising:
providing a substrate; and
configuring an array of nano-reflectors to form a pattern on the substrate and to generate a holographic image corresponding to the pattern at a predetermined distance from the holographic security element when irradiated with a predetermined light source, wherein the array of nano-reflectors is configured to generate the holographic image at the predetermined distance to have a size that is larger than a size of the pattern.

In various embodiments, the size of the pattern is at most of micron scale and the size of the holographic image is at least of centimeter scale.

In various embodiments, the size of the pattern has a largest lateral dimension that is smaller than about 1,000 micrometers, and the size of the holographic image has a smallest lateral dimension that is larger than about 1 centimeter.

In various embodiments, the size of the holographic image is at least 50 times larger than the size of the pattern.

In various embodiments, the array of nano-reflectors is configured to directly generate the holographic image at the predetermined distance.

In various embodiments, the above-mentioned configuring the array of nano-reflectors comprises configuring spatial locations of the nano-reflectors in the array of nano-reflectors on the substrate to form the pattern such that interference of the reflected light from the array of nano-reflectors when irradiated with the predetermined light source generates the holographic image having substantially the above-mentioned size at the predetermined distance.

In various embodiments, the spatial locations of the nano-reflectors are configured based on a genetic algorithm, and wherein based on the genetic algorithm, the above-mentioned configuring the spatial locations of the nano-reflectors comprises:

mutating a current chromosome array comprising nano-reflector location information to produce a mutated chromosome array;

computing an interference of reflected light at the predetermined distance based on the nano-reflector location information of the mutated chromosome array; and determining whether to accept the mutated chromosome array based on whether the computed interference associated with the mutated chromosome array is closer to a target interference of reflected light at the predetermined distance for generating the holographic image than a computed interference of reflected light at the predetermined distance associated with the current chromosome array.

In various embodiments, the current chromosome array comprises a plurality of elements, each element respectively corresponding to a possible nano-reflector location on the substrate and indicates a presence or an absence of a nano-reflector at the possible nano-reflector location, and the above-mentioned configuring the spatial locations of the nano-reflectors comprises performing iteratively, for each element of multiple elements or each subset of multiple subsets of elements of the plurality of elements, the above-mentioned mutating a current chromosome array, the above-mentioned computing an interference and the above-mentioned determining whether to accept the mutated chromosome array.

In various embodiments, the above-mentioned configuring the spatial locations of the nano-reflectors further comprises generating an initial chromosome array comprising the plurality of elements, each element being randomly set to indicate either a presence or an absence of a nano-reflector at the corresponding possible nano-reflector location.

In various embodiments, the predetermined light source is a laser light source.

In various embodiments, each of the array of nano-reflectors is a nano-mirror.

According to a third aspect of the present invention, there is provided an article having one or more holographic security elements incorporated therein, each of the one or more holographic security element comprises:

a substrate; and an array of nano-reflectors configured to form a pattern on the substrate and to generate a holographic image corresponding to the pattern at a predetermined distance from the holographic security element when irradiated with a predetermined light source, wherein the array of nano-reflectors is configured to generate the holographic image at the predetermined distance to have a size that is larger than a size of the pattern.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

Various embodiments of the present invention provide a security element and a method of forming thereof, and more particularly, to a holographic security element that may be incorporated in (e.g., embedded in, attached to or applied to) an article of interest for anti-counterfeiting.

Figure 1:
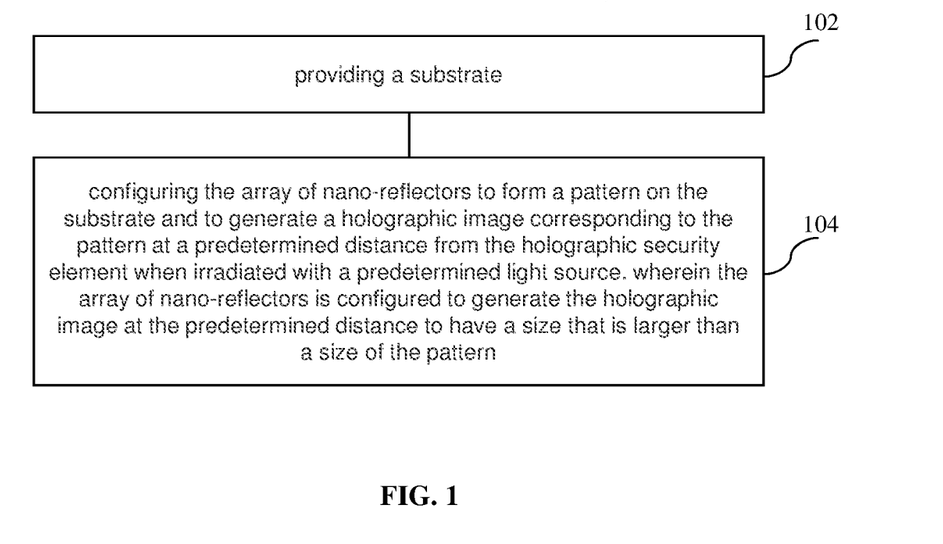
FIG. 1 depicts a schematic flow diagram of a method of forming a holographic security element according to various embodiments of the present invention.

FIG. 1 depicts a schematic flow diagram of a method 100 of forming (or fabricating/manufacturing) a holographic security element. The method 100 comprises providing (at 102) a substrate; and configuring (at 104) an array of nano-reflectors to form a pattern on the substrate and to generate a holographic image corresponding to the pattern at a predetermined distance from the holographic security element when irradiated with a predetermined light source. In particular, the array of nano-reflectors is configured to generate the holographic image at the predetermined distance to have a size that is larger than a size of the pattern.

In various embodiments, the array of nano-reflectors may be a two-dimensional (2D) array of nano-reflectors. In various embodiments, the size of the holographic image is an overall size such as the lateral or planar cross-sectional dimensions (e.g., area) of the holographic image. Similarly, in various embodiments, the size of the pattern is an overall size such as the lateral or planar cross-sectional dimensions (e.g., area) of the pattern. Accordingly, as the array of nano-reflectors is configured to generate the holographic image at a predetermined distance from the substrate (e.g., above or over the substrate) to have a size that is larger than a size of the pattern formed on the substrate, for example, the area required for forming the array of nano-reflectors may advantageously be reduced, while the holographic image generated (e.g., projected) by the array of nano-reflectors may still be visible by a person without requiring the use of a specialized magnifying or light-collecting optical instrument, such as a magnifying glass or a microscope, between the holographic imaging plane (e.g., image screen) and the hologram plane (plane of the security element or the array of nano-reflectors). As a result, the footprint required for the security element may be reduced, thus advantageously enabling the security element to be more readily incorporated in (e.g., embedded in, attached to or applied to) an article of the interest desired to have anti-counterfeiting protection, therefore improving the feasibility and applicability of the security element.

In various embodiments, the size of the pattern is at most of micron scale and the size of the holographic image is at least of centimeter scale. Accordingly, the array of nano-reflectors of at most micro scale is advantageously configured to generate the holographic image at the predetermined distance to have a size that is at least of centimeter scale. Therefore, in various embodiments, the array of nano-reflectors is advantageously configured to generate the holographic image at the predetermined distance to have a size that is significantly larger than the size of the pattern.

In various embodiments, the size of the pattern has a largest lateral dimension (planar cross-sectional dimension) that is smaller than about 1,000 μm (micrometers), and the size of the holographic image has a smallest lateral dimension (planar cross-sectional dimension) that is larger than about 1 cm (centimeter). In other words, for example, the pattern occupies an area on the substrate whereby the largest dimension of the area (i.e., length or width) is smaller than 1,000 atm, and the holographic image generated at the predetermined distance occupies an area having a largest dimension (i.e., length or width) that is larger than about 1 centimeter. In various embodiments, the largest lateral dimension of the pattern is in the range of about 50 μm to about 1,000 μm, and the smallest lateral dimension of the holographic image is in the range of about 1 cm to about 20 cm. In various embodiments, the largest lateral dimension of the pattern may be in a range of about 60 μm to about 900 μm, a range of about 70 μm to about 800 μm, a range of about 80 μm to about 700 μm, a range of about 90 μm to about 600 μm, a range of about 100 μm to about 500 μm, a range of about 110 μm to about 400 μm, a range of about 120 μm to about 300 μm, a range of about 130 μm to about 200 μm, or a range of about 140 μm to about 180 urn. In various embodiments, the smallest lateral dimension of the holographic image may be in a range of about 2 cm to about 18 cm, a range of about 4 cm to about 16 cm, a range of about 6 cm to about 14 cm, a range of about 8 cm to about 12 cm, or a range of about 9 cm to about 11 cm.

In various embodiments, a nano-reflector may refer to a reflector having a size in the nano-scale, such as having a largest lateral dimension in the range of about 20 nm to about 400 nm. In various embodiments, the largest lateral dimension may be in a range of about 30 nm to about 350 nm, a range of about 40 nm to about 300 nm, a range of about 50 nm to about 250 nm, a range of about 60 nm to about 200 urn, a range of about 70 nm to about 150 nm, or a range of about 80 nm to about 100 nm. In various embodiments, the largest lateral dimension may be set based on a subwavelength of visible light range.

In various embodiments, the size of the holographic image is at least 50 times larger than the size of the pattern. In various embodiments, the size of the holographic image is about 50 times to 200 times the size of the pattern. In various embodiments, the size of the holographic image may be about 60 times to 180 times, about 70 times to 160 times, about 80 times to 140 times, about 90 times to 120 times, or about 100 times to 110 times larger than the size of the pattern.

In various embodiments, the array of nano-reflectors is configured to directly generate the holographic image at the predetermined distance, that is, without requiring the use of a specialized magnifying or light-collecting optical instrument, such as a magnifying glass or a microscope, along the predetermined distance, such as between the holographic imaging plane (e.g., image screen) and the hologram plane (plane of the security element or the array of nano-reflectors). In other words, the array of nano-reflectors is advantageously configured to generate (e.g., project) the holographic image having a size as described herein according to various embodiments at the predetermined distance (e.g., above the substrate) that is observable or resolvable by the naked eye (unaided eye).

In various embodiments, configuring the array of nano-reflectors comprises configuring spatial locations (or positions) of the nano-reflectors in the array of nano-reflectors on the substrate to form the pattern such that interference of the reflected light from the array of nano-reflectors when irradiated with the predetermined light source generates the holographic image having substantially said size at the predetermined distance.

In various embodiments, the spatial locations of the nano-reflectors are configured based on a genetic algorithm (which may also be referred to as a genetic method or technique). In particular, based on the genetic algorithm, the above-mentioned configuring the spatial locations of the nano-reflectors comprises mutating a current chromosome array comprising nano-reflector location information (or position information) to produce a mutated chromosome array; computing an interference of reflected light at the predetermined distance based on the nano-reflector location information of the mutated chromosome array; and determining whether to accept the mutated chromosome array based on whether the computed interference associated with the mutated chromosome array is closer to a target interference of reflected light at the predetermined distance for generating the holographic image than a computed interference of reflected light at the predetermined distance associated with the current chromosome array.

In various embodiments, the current chromosome array comprises a plurality of elements, each element respectively corresponding to a possible nano-reflector location on the substrate and indicates a presence or an absence of a nano-reflector at the possible nano-reflector location, and the above-mentioned configuring the spatial locations of the nano-reflectors comprises performing iteratively, for each element of multiple elements or each subset of multiple subsets of elements of the plurality of elements, the above-mentioned mutating a current chromosome array, the above-mentioned computing an interference and the above-mentioned determining whether to accept the mutated chromosome array. For example, the spatial locations of the nano-reflectors in the array of nano-reflectors may be configured based on mutating a current chromosome array iteratively with respect to each element of multiple elements of the current chromosome array (i.e., one iteration for each element), and for each iteration, performing the above-mentioned computing an interference and the above-mentioned determining whether to accept the mutated chromosome array. In various embodiments, accepting the mutated chromosome array comprises updating or setting the current chromosome array as the mutated chromosome array, or in other words, replacing the current chromosome array with the mutated chromosome array. After the spatial locations of the nano-reflectors on the substrate have been configured (or determined) based on the genetic algorithm, the array of nano-reflectors may then be configured (or formed) on the substrate based on (or in accordance with) the nano-reflector location information of the current chromosome array (latest current chromosome array) to form the corresponding pattern on the substrate.

By way of example and without limitation, the chromosome array may be in form of a binary string where each element of the binary string is either a binary '1' (e.g., indicating the presence of a nano-reflector at the corresponding possible nano-reflector location) or a binary '0' (e.g., indicating the absence of a nano-reflector at the corresponding possible nano-reflector location).

In various embodiments, the above-mentioned configuring the spatial locations of the nano-reflectors further comprises generating an initial chromosome array comprising the plurality of elements, each element being randomly set to indicate either a presence or an absence of a nano-reflector at the corresponding possible nano-reflector location. In other words, the initial chromosome array may be randomly set initially.

In various embodiments, the predetermined light source is a laser light source, such as but not limited to, a green laser light source that is, for example, commercially available.

In various embodiments, each of the array of nano-reflectors is a nano-mirror. By way of examples only and without limitations, the nano-reflector or the nano-mirror may be made of metal(s), such as but not limited to, gold, silver and/or aluminum.

Figure 2:
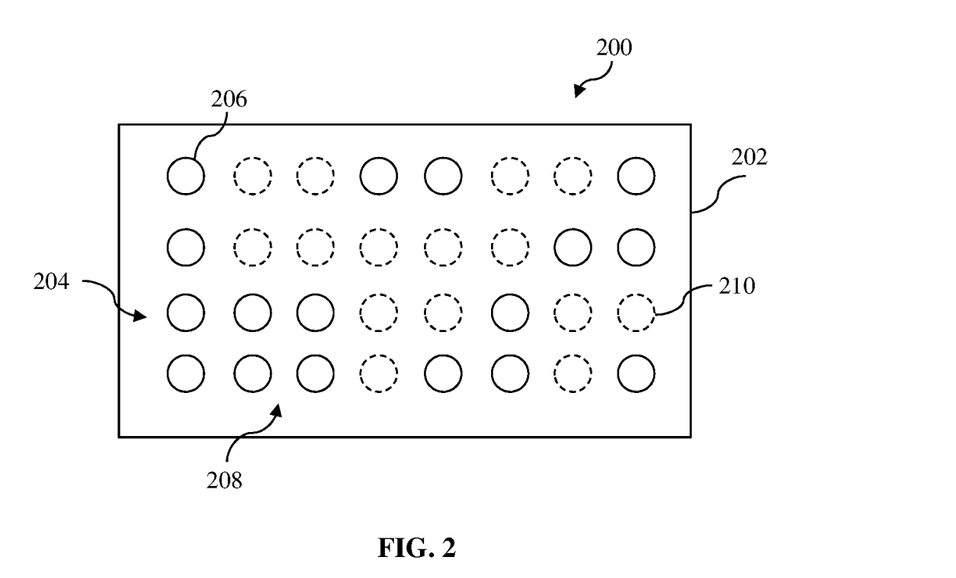
FIG. 2 depicts a schematic drawing of a top view of a holographic security element according to various embodiments of the present invention.

FIG. 2 depicts a schematic drawing of a top view of a holographic security element 200 according to various embodiments of the present invention. The holographic security element 200 comprises a substrate 202; and an array 204 of nano-reflectors 206 configured to form a pattern 208 on the substrate and to generate a holographic image corresponding to the pattern 208 at a predetermined distance from the substrate 202 when irradiated with a predetermined light source. In particular, the array 204 of nano-reflectors 206 is configured to generate the holographic image at the predetermined distance to have a size that is larger than a size of the pattern.

In FIG. 2, for illustration purpose only and without limitation, each circle denotes a possible nano-reflector location (position) on the substrate 202, whereby each full circle 206 denotes the presence of a nano-reflector on the substrate 202 at the corresponding possible nano-reflector location and each dashed circle 210 denote the absence of a nano-reflector on the substrate 202 at the corresponding possible nano-reflector location. Accordingly, the array 204 of nano-reflectors 206 may be made up of the nano-reflectors 206 configured on the substrate 202 according to various embodiments of the present invention, which forms the corresponding pattern 208 on the substrate 202.

It will be understood by a person skilled in the art that the possible nano-reflector locations on the substrate 202 and the array of nano-reflectors configured on the substrate 202 are shown in FIG. 2 for illustration purpose only and without limitation. For example, it will be appreciated by a person skilled in the art that in practice, a large number of nano-reflectors 206 may be configured to form a pattern on the substrate 202 for generating a holographic image corresponding to the pattern, such as tens or hundreds of thousands of nano-reflectors 206 or more, such as millions of nano-reflectors 206. Therefore, it will be understood by a person skilled in the art that FIG. 2 is not indicative of the number of possible nano-reflector locations on the substrate 202 and the number of nano-reflectors configured on the substrate 202, and any number may be provided or determined as desired or as appropriate for various purposes.

In various embodiments, the nano-reflector 206 may be configured to have a circular shape (circular cross-section) as shown in FIG. 2 to, for example, provide a polarization-independent hologram, such as a circular disk or cylinder (e.g., flat circular nano-reflector). However, the present invention is not limited to the nano-reflector 206 having a circular shape, and in various other embodiments, other shapes such as but not limited to rectangular or elliptical shapes may also be used as desired or as appropriate. However, such a non-circular shape may not have the merit(s) of polarization-independent associated with circular nano-reflectors. The nano-reflector 206 is also not limited to any particular size in general and the size of the nano-reflector 206 may be configured or determined as desired or as appropriate for various purposes. For example, the size of the nano-reflector 206 may be configured or determined in consideration that different size of the nano-reflector 206 may affect the diffraction efficiency and the quality of the holographic image generated. In various embodiments, for example in the case of the nano-reflector 206 having a circular shape, a preferred range of the diameter of the nano-reflector 206 may be in the range of tens of nanometers to hundreds of nanometers for visible range hologram, such as but not limited to, a range of 10 nm to 1,000 nm, a range of 20 nm to 800 nm, a range of 30 nm to 600 nm, a range of 40 nm to 500 nm, a range of 50 nm to 350 nm, a range of 70 nm to 300 nm, a range of 100 nm to 200 nm, and a range of 130 nm to 170 nm.

In various embodiments, the holographic security element 200 corresponds to the holographic security element formed by the method 100 as described hereinbefore with reference to FIG. 1, therefore, various features of the holographic security element 200 may correspond to (e.g., the same as) those of the holographic security element formed by the method 100 according to various embodiments, and thus need not be repeated with respect to the holographic security element 200 shown in FIG. 2 for clarity and conciseness. In other words, various embodiments described herein in context of the method 100 as shown in FIG. 1 are analogously valid for the holographic security element 200 shown in FIG. 2, and vice versa.

Figure 3:
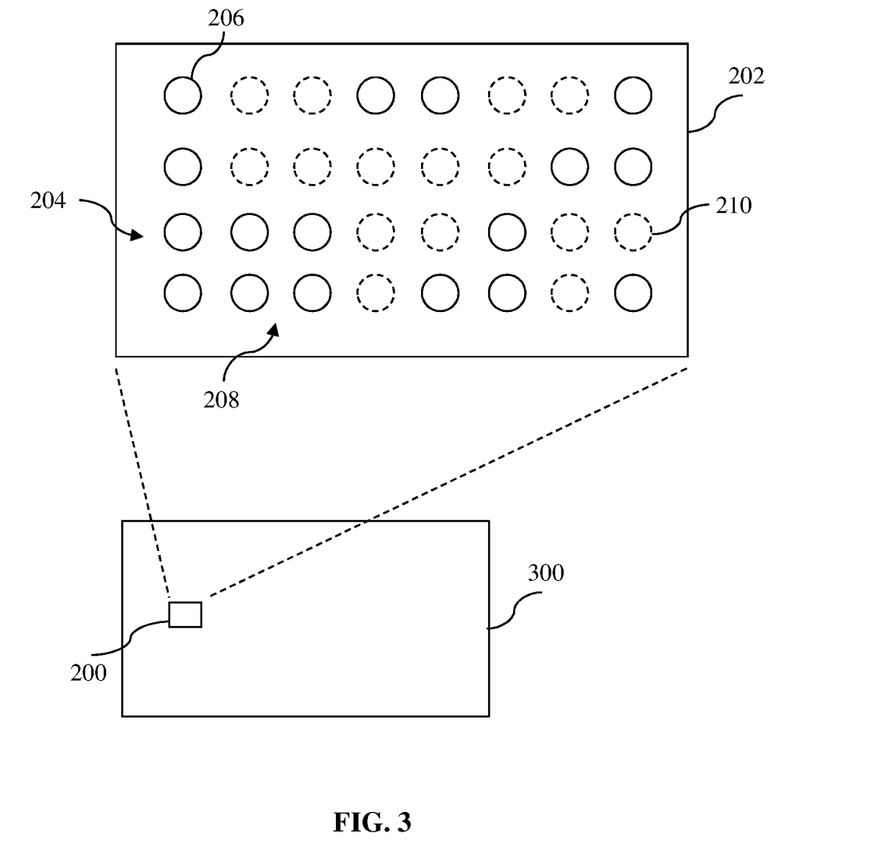
FIG. 3 depicts a schematic drawing of a top view of an article having one or more holographic security elements as shown in FIG. 2 incorporated therein according to various embodiments of the present invention.

FIG. 3 depicts a schematic drawing of a top view of an article 300 having one or more holographic security elements 200 as described herein according to various embodiments incorporated therein (e.g., embedded in, attached to or applied to). It will be appreciated by a person skilled in the art that one or more holographic security elements 200 may be incorporated in any article of the interest desired to have anti-counterfeiting protection, for example, various items or documents, such as but not limited to, smart cards, banknotes, security documents, and luxury and high-value consumer products.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present inventions will be described hereinafter by way of examples only and not limitations. It will be appreciated by a person skilled in the art that the present invention may, however, be embodied in various different forms and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to the array of nano-reflectors being an array of nano-mirrors and each nano-reflector having a circular cross-section.

Various example embodiments of the present invention provide reflective nano-mirror holograms for anti-counterfeiting. In particular, various example embodiments of the present invention provide a reflection-mode, large angle-of-view nano-mirror-based colour hologram which employs an array of nano-mirrors (which may also be referred to as "point sources") to reconstruct the desired diffractive image (e.g., corresponding to the "holographic image" described herein according to various embodiments). The holography approach according to various example embodiments exhibits a superior tolerance to the incident angle of a tilting plane wave to provide a large angle-of-view. For example, this high angle-tolerance enables the hologram to exhibit a unique functionality of a lensing/amplification effect for a magnified image projection without requiring the use of an optical magnifying component between the holographic imaging plane (e.g., image screen) and the hologram plane (plane of the security element or the array of nano-mirrors). Such a lensing functionality advantageously enables applications as, for example, a security element (e.g., a security tag). For example, a first level of security is the hologram generated which can be easily identified by a person using, for example, a commercially-available green laser pointer, and a second level of security is the nanoscale features (corresponding to the nano-mirrors) that require authentication by a specialised tool/instrument, such as a Scanning Electron Microscope (SEM).

Various example embodiments provide an anti-counterfeiting approach or method that projects a centimeter-scale holographic image, observable to the naked eye, onto an opaque background using nanoscale mirrors occupying an area of only tens or hundreds of microns which eases challenge(s) of large area nanofabrication.

Various example embodiments provide a method for anti-counterfeiting by using a micro-hologram that is in the size of hundreds of microns, which advantageously greatly eases fabrication concern(s) of nano-features in large area.

Various example embodiments provide a method for anti-counterfeiting by using a micro-hologram and a point laser source.

Various example embodiments provide a structure and a method for anti-counterfeiting that shows tiny spots (corresponding to the "nano-reflectors" or "point sources" as described herein according to various embodiments) on a substrate surface, but a large image viewable to the naked eye in projection.

Various example embodiments provide a structure comprising nano-mirrors that can form (e.g., generate or project) a large-angle-of view holographic image. This reflective mode nano-mirror colour hologram approach or technique produces a lensing/amplification effect which yields a magnified image projection, that is, it amplifies a micron scale pattern area to a centimeter scale image without the requirement of an optical magnifying component between the holographic imaging plane and the hologram plane. Accordingly, such a technique may be applied for security tagging, which enables the tag feature area to be visible (when projected into a holographic image) without the above-mentioned specialised optical magnifying instruments (e.g., magnifying glass or microscope), thus facilitating easy verification for a person (e.g., a general consumer).

As described in the background of the present specification, various challenges hamper widespread use of nanoscale elements in the field of security tagging. As such, there exist challenges for unique, scalable and covert security solutions that could be detected easily and repeatably without compromise, in order to circumvent counterfeiting. For example, various example embodiments of the present invention tackle the two-fold problem of doing away with large fabrication area on the substrate, while enabling the security element (security tag) to be seen without the need for specialised optical magnifying instruments between the holographic imaging plane and the hologram plane.

Figure 4:
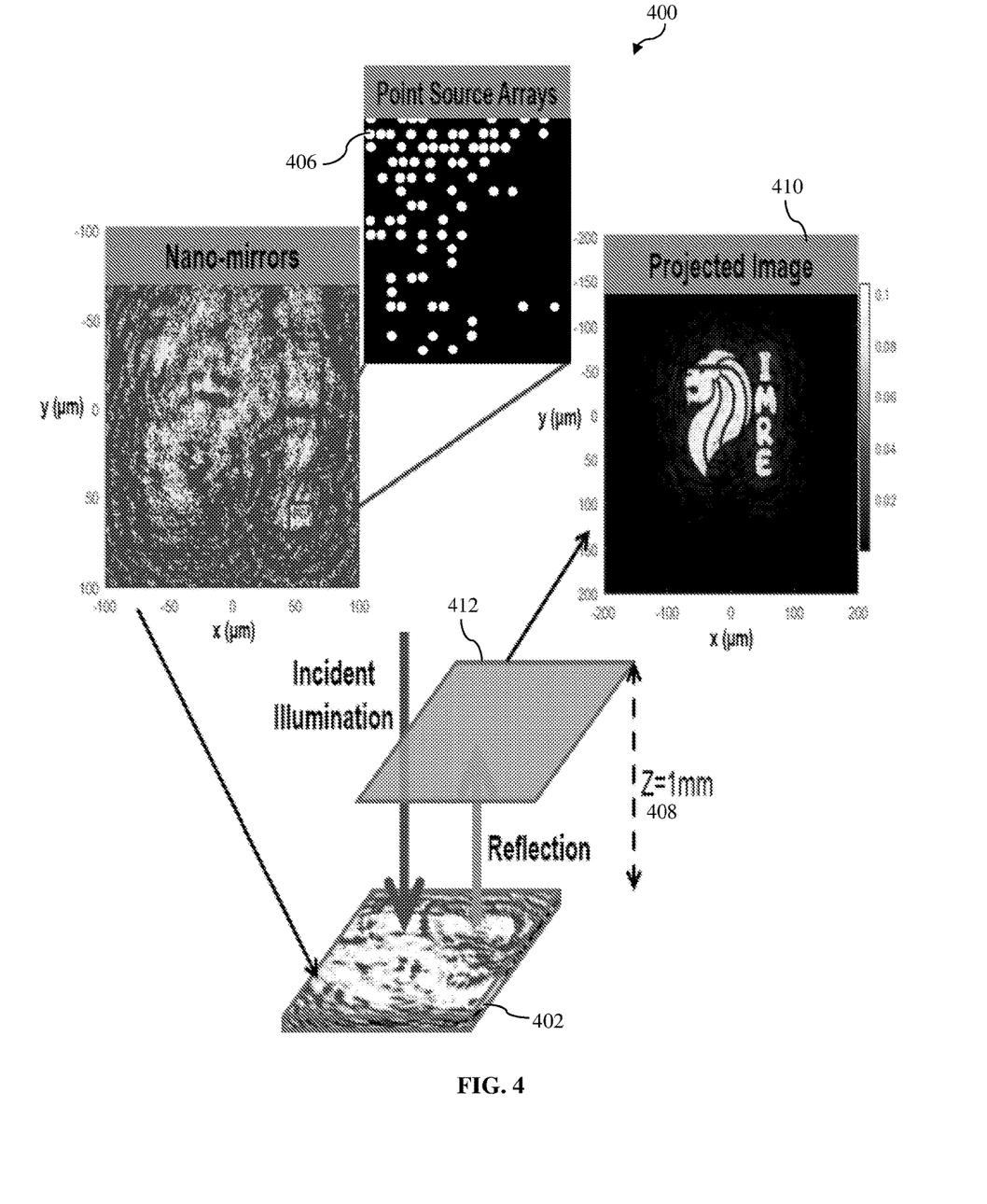
FIG. 4 depicts an overview of a working operation of a nano-mirror based reflective-mode hologram according to various example embodiments of the present invention.

FIG. 4 depicts an overview of a working operation of a nano-mirror based reflective-mode hologram (or simply referred to as a reflective nano-mirror hologram) 400 according to various example embodiments of the present invention. The nano-mirror based reflective-mode hologram 400 is advantageously able to produce high-quality images even under a large angle-of-view. The nano-mirror hologram 400 is configured to operate in the reflective mode with metal nano-mirrors 406 formed on a transparent substrate 402. As such, the nano-mirror hologram 400 has advantageously been found to reflect sufficient light for constructing a holographic image 410 (e.g., more light than conventional anti-counterfeiting techniques based on light transmission mode), thus allowing for a highly-efficient hologram.

In various example embodiments, the array of nano-mirrors 406 have a uniform size and the amplitude 408 (e.g., corresponding to the "predetermined distance" as described herein according to various embodiments) of light reflected from array of nano-mirrors 406 is at unity. Not wishing to be bound by theory, but after light is reflected from a nano-mirror 406, the diffracted light may be described using the Rayleigh-Sommerfeld diffraction theory. In this regard, once the diffraction field of a single nano-mirror (nano-disk) 406 is known, the total electric field of an array of nano-mirrors 406 may then be derived by summing the electric field components of all the nano-mirrors 406 comprised in the array. To realise a holographic image 410 at a given distance z 408 from the array of nano-mirrors 406, according to various example embodiments of the present invention, the spatial location of each of the nano-mirrors 406 is configured (e.g., determined) using a genetic algorithm. Accordingly, the working operation of the reflective nano-mirror hologram 400 may therefore be based on a particular or predetermined manipulation of interference (total electric field by the array of nano-mirrors 406) of reflected light from the array of nano-mirrors 406 to realise the target holographic image at the predetermined distance 408 from the substrate 402.

Accordingly, in the embodiment of FIG. 4, the amplitude 408 of light reflected from same-size nano-mirrors 406 is assumed or configured to be at unity and Rayleigh-Sommerfeld diffraction theory is used to describe the light diffracted from each nano-mirror 406. The total electric field of the array of nano-mirrors 406 may then be derived by summing the diffraction field from each nano-mirror comprised in the array of nano-mirrors 406. A genetic algorithm may then be employed to calculate (determine) the exact spatial distribution of each nano-mirror on the substrate 402 for projecting a holographic image at a distance z 408 away based on the interference of reflective light from the array of nano-mirrors 406.

Figure 5A:
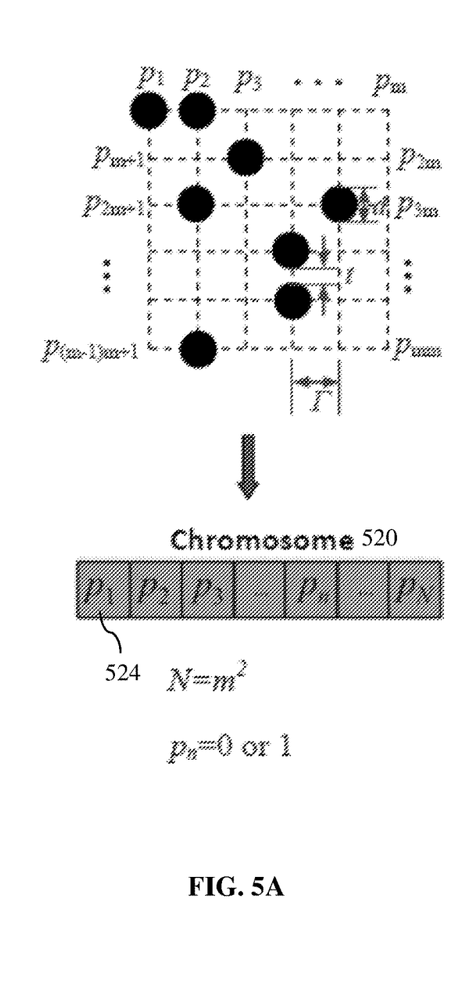
FIGS. 5A to 5C show various aspects of an example genetic algorithm configured for determining spatial distribution of an array of nano-mirrors on a substrate according to various example embodiments of the present invention.
Figure 5B:
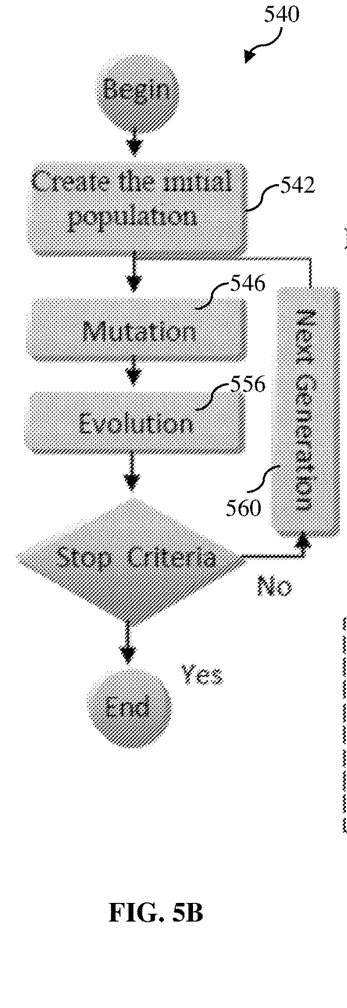
Figure 5C:
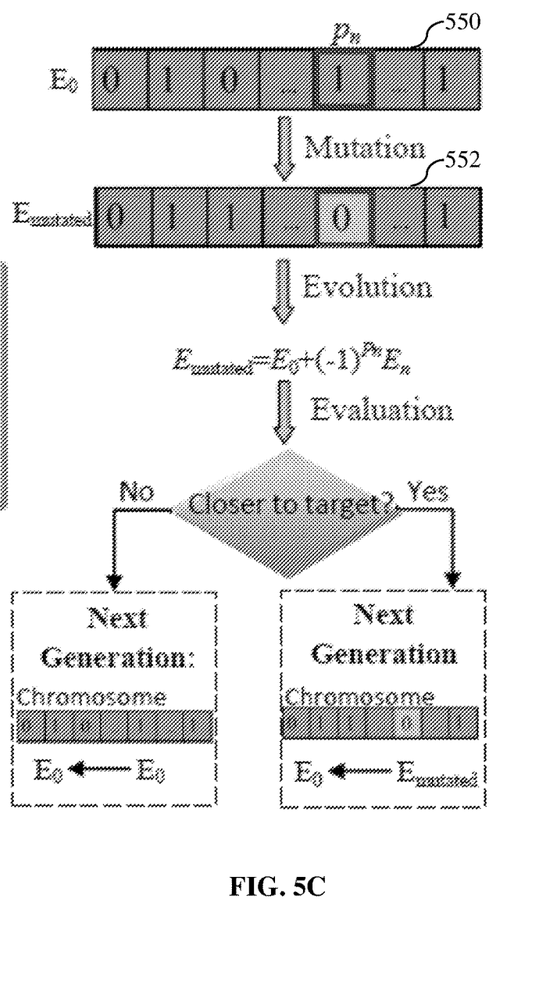

For illustration purpose and without limitation, an example genetic algorithm configured for determining spatial distribution (spatial locations) of the array of nano-mirrors 406 on the substrate 402 will now be described with reference to FIGS. 5A to 5C according to various example embodiments of the present invention. As described hereinbefore, the spatial locations of the array of nano-mirrors 406 may be determined based on interference (total electric field by the array of nano-mirrors 406) of the reflected light from the array of nano-mirrors 406 to obtain a desired enlarged holographic image 410 at a predetermined or particular distance 408 from the substrate 402. In particular, FIG. 5A depicts a technique or mechanism of building up (generating) a chromosome array 520 (which may simply be referred to as "chromosome") for implementing the genetic algorithm. In FIG. 5A, black dots located on grid nodes represent the nano-mirrors 406, whereby each nano-mirror 406 has a diameter d and a minimum edge-to-edge distance t. FIG. 5B depicts a flow diagram of operations or stages of the example genetic algorithm 540 according to various example embodiments of the present invention. FIG. 5C depicts a flow diagram of an example implementation of the example genetic algorithm 540 according to various example embodiments of the present invention.

In relation to the initialization operation 542 of the genetic algorithm 540, all of the nano-mirrors 406 may be assumed to be located at respective grid nodes, with a total of N=m×m grid nodes as shown in FIG. 5A. Thus, the smallest edge-to-edge distance t may be fixed at t=Γ−d, where the grid period Γ=450 nm and the nano-mirror diameter d=300 nm in a non-limiting example embodiment. The chromosome 520 comprises nano-mirror location information (position information), namely, $p_1$ to $p_N$ as shown in FIG. 5A. In other words, the chromosome 520 comprises a plurality of elements $p_n$ 524, each element 524 respectively corresponding to a possible nano-mirror location on the substrate 402 and indicates a presence or an absence of a nano-reflector at the possible nano-reflector location. Accordingly, as shown in FIG. 5A, the chromosome 520 may be in form of a binary string where each element of the binary string is either a binary '1' (e.g., indicating the presence of a nano-mirror at the corresponding possible nano-mirror location) or a binary '0' (e.g., indicating the absence of a nano-mirror at the corresponding possible nano-mirror location). In particular, the initialization stage 542 may include generating an initial chromosome 520 comprising a plurality of elements 524, each element 524 being randomly set to indicate either a presence or an absence of a nano-reflector at the corresponding possible nano-reflector location. For example, every element $p_n$ 524 in the initial chromosome 520 may takes a random value, which may be obtained by using a random function, such as the function of 'rand' in MATLAB.

In relation to the mutation operation 546 of the genetic algorithm 540, the mutation operation 546 may include mutating a current chromosome array 550 comprising nano-reflector location information to produce a mutated chromosome array 552. For example, the mutation operation 546 may be realized by randomly selecting an element 524 of the chromosome 520 and modifying its value (e.g., changing it from binary '0' to '1' or from binary '1' to '0'), as for example illustrated in FIG. 5C.

In relation to the evolution operation 556 of the genetic algorithm 540, the evolution operation 556 may include computing an interference of reflected light at the predetermined distance based on the nano-mirror location information of the mutated chromosome array 552. For example, the evolution operation 556 may calculate the intensity at the target imaging plane 412, which may be chosen according to a particular requirement, such as Fresnel or Fraunhofer diffraction. For a given chromosome 550 whose evolution result is $E_0$ that is the electric field at the target imaging plane 412, the n-th gene (n-th element) 524 taking the value of $p_n=1$ mutates so that a new chromosome (mutated chromosome) 552 is generated. The evolution result $E_{mutated}$ of the mutated chromosome 552 may then be computed using, for example, $E_{mutated}=E_0+(-1)^{p_n} \times E_n$, where $p_n$ takes the value before mutation and $E_n$ denotes the electric field diffracting from the nano-mirror located at the n-th node. Accordingly, the evolution operation 546 may be implemented with ease by only utilizing a simple addition operation, which makes the design or configuration of the nano-mirror array flexible without any limitation on nano-mirror number and total size of nano-mirror array, which advantageously allows a large-scale nano-device to be achieved.

In relation to the next generation operation 560 of the genetic algorithm 540, the next generation operation 560 may include determining whether to accept the mutated chromosome array 552 based on whether the computed interference associated with the mutated chromosome array 552 is closer to a target interference of reflected light at the predetermined distance for generating the holographic image than a computed interference of reflected light at the predetermined distance associated with the current chromosome array 550, as for example illustrated in FIG. 5C. For example, after evaluation, the mutated chromosome 552 may be accepted as the new generation chromosome (e.g., the current chromosome 550 may be updated or replaced with the mutated chromosome 552) if the evolution result is closer to the target interference. Otherwise, the mutated chromosome 552 may simply be discarded without any change to the current chromosome 550 and the evolution $E_0$. In various example embodiments, whether the evolution result $E_{mutated}$ is closer to the target interference than the current result $E_0$ based on a root mean square error (RMSE) function. For example, the evolution result $E_{mutated}$ is accepted (or rejected) by comparing the RMSE between the intensity profile computed based on the mutated chromosome 522) and the target intensity profile with the RMSE between the intensity profile computed based on the current chromosome 550. For example, if the comparison returns a smaller RMSE, then the evolution result $E_{mutated}$ is accepted. Otherwise, the evolution result $E_{mutated}$ (and the associated mutated chromosome 552) is rejected. In various example embodiments, when the RMSE is smaller than a predetermined threshold value, such as but not limited to, 10%, the mutated chromosome may be determined to be acceptable as a final chromosome based on which the array of nano-mirrors may then be configured, and the genetic algorithm may then stop (which may be referred to as a stop criteria).

In various example embodiments, the genetic algorithm 540 is configured to perform iteratively, for each element of multiple elements or each subset of multiple subsets of elements of the plurality of elements, the mutation operation 546, the evolution operation 556 and the next generation operation 560. In other words, the mutation operation 546, the evolution operation 556 and the next generation operation 560 are repeated for the above-mentioned each element or each subset of elements. For example, in the case of the genetic algorithm 540 being configured to perform iteratively for each element, the next gene (element) in the iteration may be randomly chosen (which has not yet been mutated) to be subjected to the mutation operation 546, and then the evolution operation 556 and the next generation operation 560. For example, the mutation operation 546, the evolution operation 556 and the next generation operation 560 are repeated for each element until all the elements in the chromosome has been mutated once or the above-described stop criteria has been met, and the resultant chromosome may indicate the nano-mirror location information for configuring the spatial locations of the nano-mirrors on the substrate that best generate the desired holographic image (with the desired profile) at the predetermined distance. For example, in the case of the genetic algorithm 540 being configured to perform iteratively for each subset of elements (i.e., when the number M of mutated genes (elements) is larger than one), the evolution operation 556 for the mutated chromosome may be implemented by $E_{mutated}=E_0+\Sigma_{m=1}^{M}(-1)^{p_m}E_m$. However, through experiments conducted according to various example embodiments of the present invention, the genetic algorithm 540 is fastest and most efficient when M=1, which makes the genetic algorithm 540 behave like a randomly binary searching algorithm. This shows its strong transplantable capacity between various algorithms.

In various example embodiments, the particular or elaborate manipulation of the interference of the reflected light to obtain the desired enlarged holographic image refers to the electric field of reflected light that can be described precisely in simulations by considering both the electric field distribution at the nano-mirror surface and the coherent superposition of the diffracting field from every nano-mirror in the array.

In various example embodiments, the array of nano-mirrors 406 may be configured to achieve various technical effects, such as, different magnifications.

For example, the high angle tolerance from the nano-mirror configuration allows the lensing effect when the hologram is illuminated with spherical wave that can be decomposed to many tilting plane wave according to Fourier transform. For example, assuming $z_s$, $z_i$ and $z_o$ represent the distance of the center of the spherical wave to the hologram plane, the distance between the imaging plane and the hologram plane, and the distance of the imaging plane to the hologram plane in planar wave incidence, respectively, the following relationships may govern the magnification M:

$$\frac{1}{z_s}+\frac{1}{z_i}=\frac{1}{z_0},$$

$$M=\frac{z_s}{z_s-z_0}.$$

Figure 6:
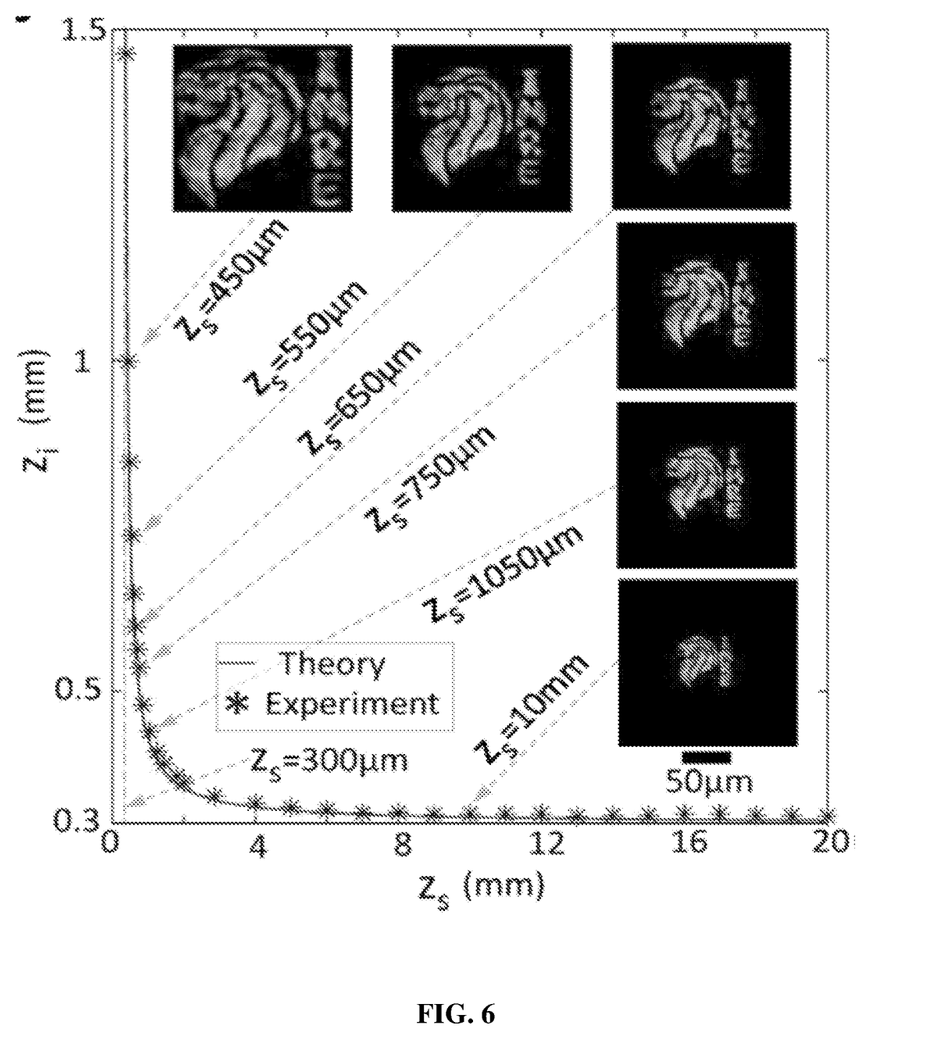
FIG. 6 illustrates the lensing magnification effect of the holographic security element according to various example embodiments of the present invention.

For example, it can be seen that when $z_s$ approaches $z_o$, the magnification can be large. Accordingly, the magnification M is related to the relative position of the array of nano-mirrors (point light sources) and the desired imaging plane position for plane wave incidence. The closer the value of $z_s$ and $z_o$ is to each other, the larger the magnification is. By way of an example only and without limitation, FIG. 6 illustrates the relationship between $z_s$ and $z_i$ for the lensing magnification effect for $z_s$=300 μm.

In various example embodiments, the large angle of view is demonstrated in various experiments with the enlarged image having high quality. Without wishing to be bound by theory, the large angle of view may come from the tolerance to the incident angle due to, at least in part, the use of nano-disks (nano-mirrors having circular cross-section) that can mimic point sources at reflected electric field when the dimension of the nano-disk is sufficient small.

In various example embodiments, the holography approach or technique according to various example embodiments of the present invention exhibits a reflective operation of about 15% efficiency and a superior tolerance to the incident angle of a tilting plane wave to provide a large angle-of-view. This high angle-tolerance enables the nano-mirror hologram to exhibit a unique functionality of a lensing/amplification effect for a magnified image projection without the requirement of an optical magnifying component, such as an amplifying lens or an optical microscope between the holographic imaging plane (e.g., image screen) and the hologram plane. Such a lensing functionality advantageously enables applications as, for example, a security element (e.g., a security tag). For example, a first level of security is the hologram generated which can be easily identified by a person using, for example, a commercially-available green laser pointer, and a second level of security is the nanoscale features (corresponding to the nano-mirrors) that require special design input as well as authentication by a specialised tool/instrument, such as a SEM.

By way of an example only and without limitation, a specific method of forming a holographic security element according to an example embodiment of the present invention will now be described. In the example embodiment, an array of nano-mirrors is fabricated using Electron Beam Lithography. A Corning glass substrate was spun with positive-tone electron beam resist PMMA (950K molecular weight, MicroChem Corp., 1.67% in anisole) at 3000 rpm to a thickness of about 180 nm. Baking of the resist was performed at 180° C. for 2 minutes. EBL was performed using an Elionix ELS-7000 EBL system (Elionix Inc.) with an accelerating voltage of 100 kV and a beam current of 500 pA. A writing field of 150 μm×150 μm was employed. No proximity-effect correction was performed for any exposure. Unexposed regions of PMMA resist were removed by immersing the samples in a 1:3 MIBK/IPA developer at room temperature for 50 seconds. The sample was blow-dried with a steady stream of N2. Metal deposition was performed using an electron beam evaporator (Explorer Coating System, Denton Vacuum Inc.) at a working pressure of about 1×10$^{-6}$ Torr. A 200 nm-thick layer of aluminum was deposited onto the sample at the rate of 2.0 Å/s. During the evaporation process, the sample chamber was kept at a constant temperature of 20° C. and the sample holder was rotated at 50 rpm to maintain uniform deposition. Lift-off was performed thereafter in NMP solvent to produce the resultant array of nano-mirrors (nano-mirror structures) as depicted in the SEM images of representative nanostructures shown in FIG. 7.

Various experiment results of the holographic security element formed in the above example embodiment will now be described.

Figure 7:
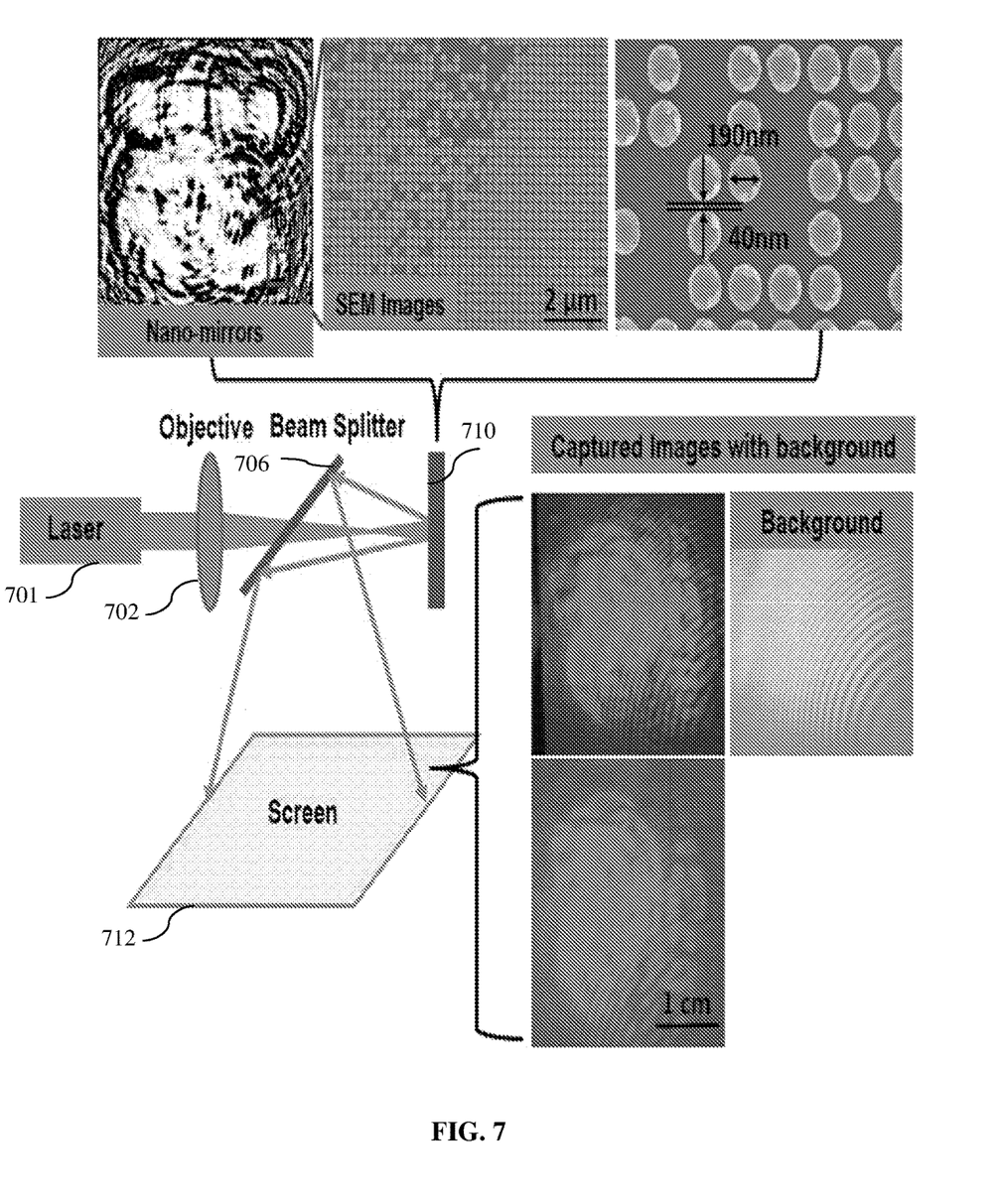
FIG. 7 depicts an example operation of the holographic security element according to an example embodiment of the present invention.

To test the reflective nano-mirror hologram, a collimated green laser 701 was first focused using a microscope objective lens 702 to generate a spherical wave. Next, the focused light was passed through a cube beam splitter 706 with the size of 5 mm×5 mm×5 mm. In order to ensure the focused spot is located outside the beam splitter 706, the working distance of the objective lens 702 was set larger than 5 mm. The fabricated sample 710 was placed 1 mm away from the focused spot so that the light illuminating the sample 710 was divergent. Light from the sample 710 was reflected in the vertical direction after passing through the beam splitter 706, as shown in the optical setup in FIG. 7. The resultant holographic image formed was then projected onto a screen 712, which in this case, was a piece of white paper. Image contrast and brightness have been post-processed and optimised for figure clarity. It was noted that the 'background' intensity arises from the reflection of areas on the quartz substrate which is void of any metallic disk nanostructures. In FIG. 7, the desired or designed holographic image composed of the icon "Merlion" and letters "IMRE" can be observed. It was noted that from the array of nano-mirrors (nanostructures) occupying an area of about 200 μm×200 μm, the lensing effect of the array of nano-mirrors has magnified this micro-pattern to an area of about 2 cm×2 cm which can be easily observed and verified with the naked eye.

Accordingly, the holographic security element according to various embodiments of the present invention include one or more of the following advantages:

1. Nano/Micro-scale features—the holographic security element (security feature or tag) comprises nano-reflectors (e.g., nanoscale metal mirror nano-patterned features) which are challenging to replicate and reproduce without knowledge of metasurface design and nanofabrication. The nano-reflectors may also be configured or customised to generate a desired holographic image.
2. Cost-effective fabrication design—the array of nano-reflectors altogether occupy a relatively small area or footprint (e.g., hundreds of microns), thus doing away with the need to fabricate an extensive area of security features which is time consuming and costly. For example, the small-size holographic security element occupies barely a dot size, thus facilitating a seamless incorporation into various articles, such as by not limited to, smart cards, banknotes, security documents, luxury, high-value consumer products and so on, without noticeably affecting the surrounding or overall aesthetics (e.g., brand aesthetics) and/or design of the article.
3. Straight-forward and non-destructive verification—a simple green laser (pointer) is sufficient to illuminate and project the hologram for a non-destructive means of inspection.
4. Lensing/amplification effect—the method of forming the holographic security element produces a lensing/amplification effect which yields a magnified image projection. For example, the method may be applied to amplify (e.g., about 100 times) a micron-scale (e.g., 200 μm) pattern area to a centimeter-scale (e.g., 2 cm) holographic image without the requirement of an optical magnifying component between the imaging plane (e.g., the image screen) and the hologram plane. This enables the security feature area (security element) to be visible (after being projected) without requiring the above-mentioned specialised optical magnifying instruments (e.g., magnifying glass or microscope) to facilitate easy verification of the security element by a person (e.g., a general consumer).

While embodiments of the present invention have been particularly shown and described with reference to specific embodiments, it should be understood by those skilled in the art that various changes in form and detail may be made therein without departing from the scope of the present invention as defined by the appended claims. The scope of the present invention is thus indicated by the appended claims and all changes which come within the meaning and range of equivalency of the claims are therefore intended to be embraced.

What is claimed is:

1. A holographic security element comprising:
a substrate; and
an array of nano-reflectors configured to form a pattern on the substrate and to generate a holographic image corresponding to the pattern at a predetermined distance from the substrate when irradiated with a predetermined light source, wherein the array of nano-reflectors is configured to generate the holographic image at the predetermined distance and the holographic image has a size that is larger than a size of the pattern, wherein
the array of nano-reflectors is a two-dimensional array, each nano-reflector of the array of nano-reflectors having a largest lateral dimension in a range of 10 nanometers to 1,000 nanometers, and
spatial locations of the array of nano-reflectors on the substrate are configured to form the pattern such that interference of light reflected from the array of nano-reflectors when irradiated with the predetermined light source generates the holographic image having substantially said size at the predetermined distance.

2. The holographic security element according to claim 1, wherein the size of the pattern has a largest lateral dimension that is smaller than 1,000 micrometers and the size of the holographic image has a smallest lateral dimension that is larger than 1 centimeter.

3. The holographic security element according to claim 2, wherein the size of the holographic image is at least 50 times larger than the size of the pattern.

4. The holographic security element according to claim 1, wherein the array of nano-reflectors is configured to directly generate the holographic image at the predetermined distance.

5. The holographic security element according to claim 1, wherein the predetermined light source is a laser light source.

6. The holographic security element according to claim 1, wherein each of the array of nano-reflectors is a nano-mirror.

7. A method of forming a holographic security element, the method comprising:
providing a substrate; and
configuring an array of nano-reflectors to form a pattern on the substrate and to generate a holographic image corresponding to the pattern at a predetermined distance from the holographic security element when irradiated with a predetermined light source, wherein the array of nano-reflectors is configured to generate the holographic image at the predetermined distance and the holographic image has a size that is larger than a size of the pattern, wherein the array of nano-reflectors is a two-dimensional array, each nano-reflector of the array of nano-reflectors having a largest lateral dimension in a range of 10 nanometers to 1,000 nanometers, and said configuring the array of nano-reflectors comprises configuring spatial locations of the nano-reflectors in the array of nano-reflectors on the substrate to form the pattern such that interference of light reflected from the array of nano-reflectors when irradiated with the predetermined light source generates the holographic image having substantially said size at the predetermined distance.

8. The method according to claim 7, wherein the size of the pattern has a largest lateral dimension that is smaller than 1,000 micrometers and the size of the holographic image has a smallest lateral dimension that is larger than 1 centimeter.

9. The method according to claim 8, wherein the size of the holographic image is at least 50 times larger than the size of the pattern.

10. The method according to claim 7, wherein the array of nano-reflectors is configured to directly generate the holographic image at the predetermined distance.

11. The method according to claim 7, wherein the spatial locations of the nano-reflectors are configured based on a genetic algorithm, and wherein based on the genetic algorithm, said configuring the spatial locations of the nano-reflectors comprises:

mutating a current chromosome array comprising nano-reflector location information to produce a mutated chromosome array;

computing an interference of light reflected at the predetermined distance based on the nano-reflector location information of the mutated chromosome array; and determining whether to accept the mutated chromosome array based on whether the computed interference associated with the mutated chromosome array is closer to a target interference of reflected light at the predetermined distance for generating the holographic image than a computed interference of reflected light at the predetermined distance associated with the current chromosome array.

12. The method according to claim 11, wherein the current chromosome array comprises a plurality of elements, each element respectively corresponding to a nano-reflector location on the substrate and indicates a presence or an absence of a nano-reflector at the nano-reflector location, and said configuring the spatial locations of the nano-reflectors comprises performing iteratively, for each element of multiple elements or each subset of multiple subsets of elements of the plurality of elements, said mutating a current chromosome array, said computing an interference and said determining whether to accept the mutated chromosome array.

13. The method according to claim 12, wherein said configuring the spatial locations of the nano-reflectors further comprises generating an initial chromosome array comprising the plurality of elements, each element being randomly set to indicate either a presence or an absence of a nano-reflector at the corresponding nano-reflector location.

14. The method according to claim 7, wherein the predetermined light source is a laser light source.

15. The method according to claim 7, wherein each of the array of nano-reflectors is a nano-mirror.

16. An article having one or more holographic security elements incorporated therein, each of the one or more holographic security element comprises:

a substrate; and an array of nano-reflectors configured to form a pattern on the substrate and to generate a holographic image corresponding to the pattern at a predetermined distance from the holographic security element when irradiated with a predetermined light source, wherein the array of nano-reflectors is configured to generate the holographic image at the predetermined distance and the holographic image has a size that is larger than a size of the pattern, wherein the array of nano-reflectors is a two-dimensional array, each nano-reflector of the array of nano-reflectors having a largest lateral dimension in a range of 10 nanometers to 1,000 nanometers, and spatial locations of the array of nano-reflectors on the substrate are configured to form the pattern such that interference of light reflected from the array of nano-reflectors when irradiated with the predetermined light source generates the holographic image having substantially said size at the predetermined distance.

* * * * *